E. F. CHANDLER.
DEVICE FOR TIMING WAGONS.
APPLICATION FILED SEPT. 29, 1906.
933,418.
Patented Sept. 7, 1909.
3 SHEETS—SHEET 2.
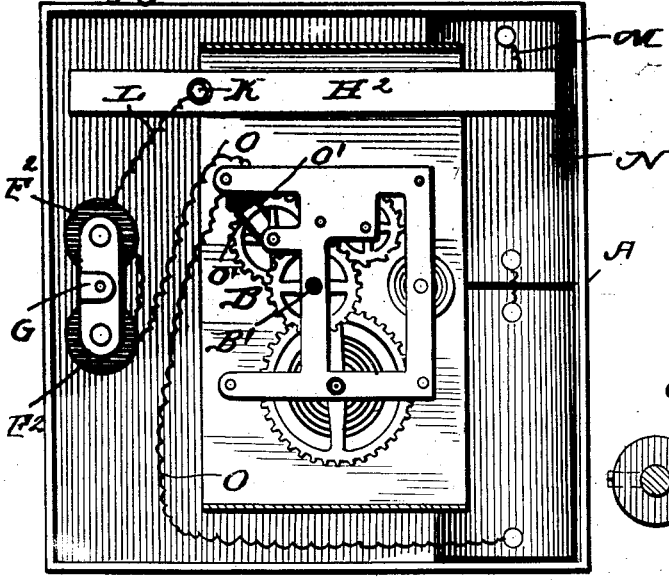
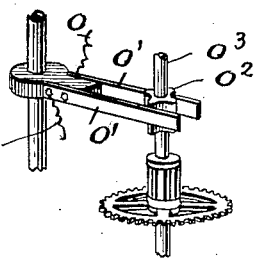
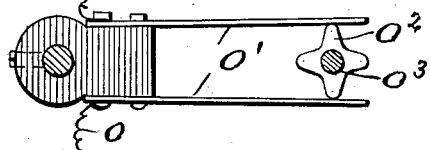
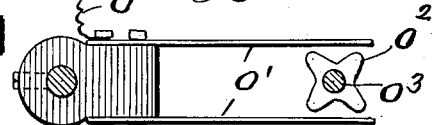
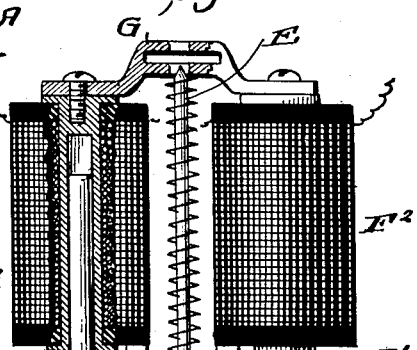
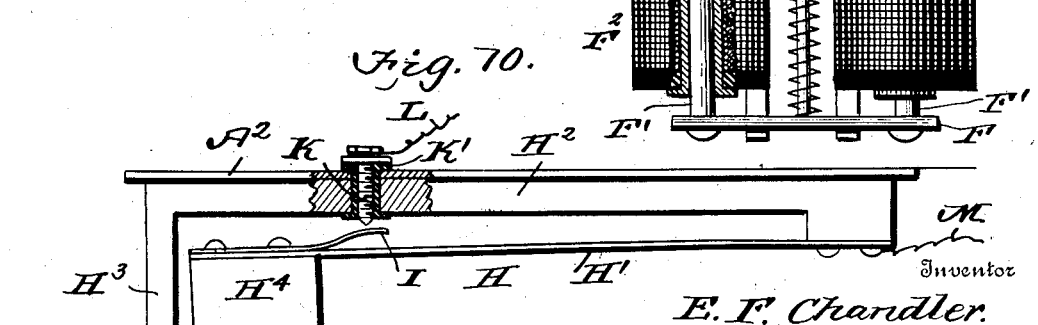
Witnesses
Inventor
E. F. Chandler.
By O'Meara & Brock,
Attorneys

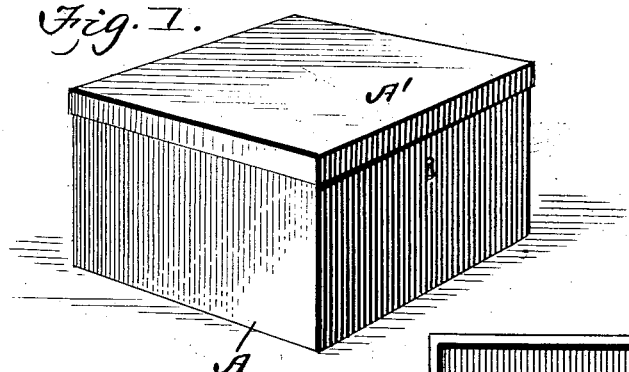
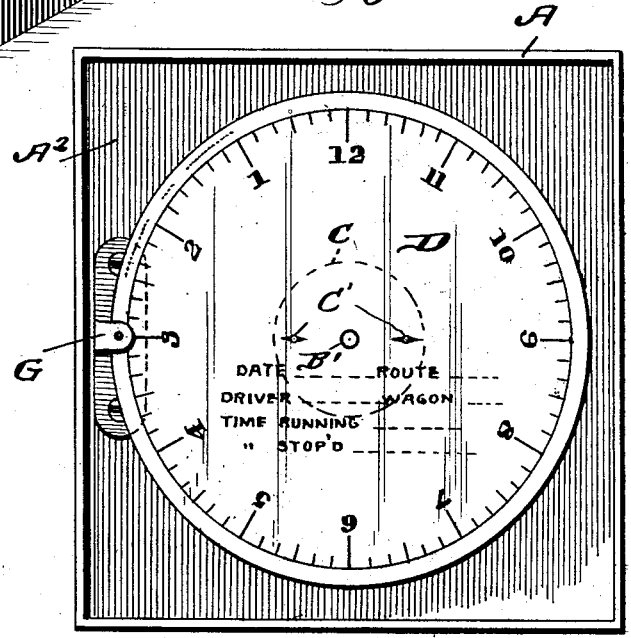
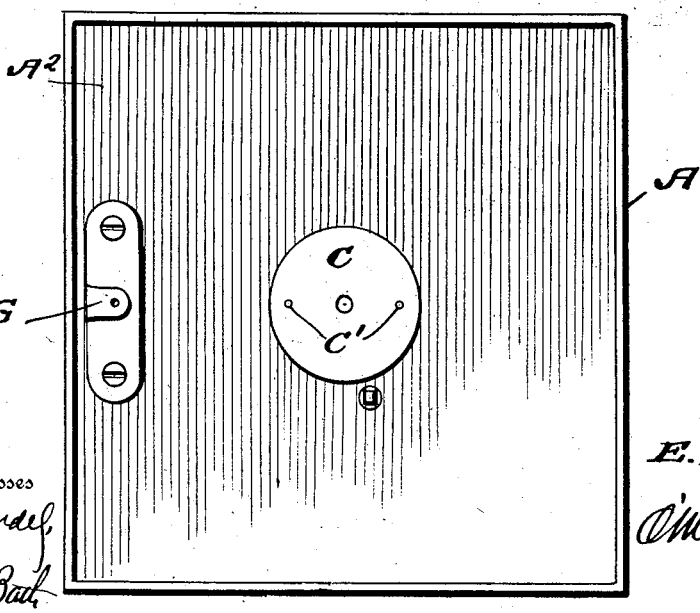

UNITED STATES PATENT OFFICE.

EDWARD FARINGTON CHANDLER, OF BROOKLYN, NEW YORK.

DEVICE FOR TIMING WAGONS.

933,418.

Specification of Letters Patent. Patented Sept. 7, 1909.

Application filed September 29, 1906. Serial No. 336,692.

*To all whom it may concern:*

Be it known that I, EDWARD F. CHANDLER, a citizen of the United States, residing at Brooklyn, in the county of Kings and State of New York, have invented a new and useful Improvement in Devices for Timing Wagons, of which the following is a specification.

This invention is a new and useful form of device for timing wagons, and is particularly adapted for use in connection with delivery wagons, and the like where quick action and short stops are necessary.

The object of the invention is to provide a device which can be arranged in or upon any form of vehicle and which will indicate and record when the vehicle is in motion, and will not only show the number of stops made by said vehicle, but will also record the duration of each and every stop. By this means the proprietor of the wagon can detect any negligence or unusual delay on the part of the driver at any period of the route, and can thereby maintain a record of each and every trip made by the vehicle.

The invention is also capable of use upon railway trains for testing cars for the purpose of indicating the condition of the road-bed or track.

The invention is also capable of use in any place where it may be desired to indicate intervals of rest and motion.

With these various objects in view, the invention consists essentially in the employment of a rotary disk or dial adapted to be indented or perforated and an indenting or perforating device together with means for operating the said perforating device whenever the apparatus is subjected to a jarring motion.

The invention consists also in the employment of a rotary dial subdivided to indicate periods of time and operated by means of a clock work, a perforating device adapted to perforate the said dial and a vibrator arranged in connection with said perforating device for the purpose of electrically operating the same whenever the device as a whole is subjected to a jarring motion.

The invention consists also in certain novel features of construction, arrangement and association, all of which will be fully described hereinafter and pointed out in the claims.

Figure 11:
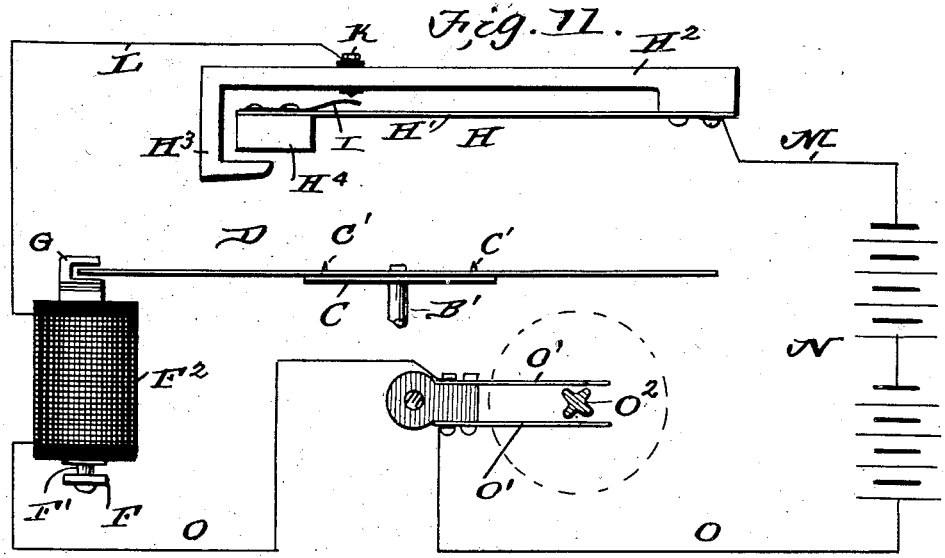
Figure 12:
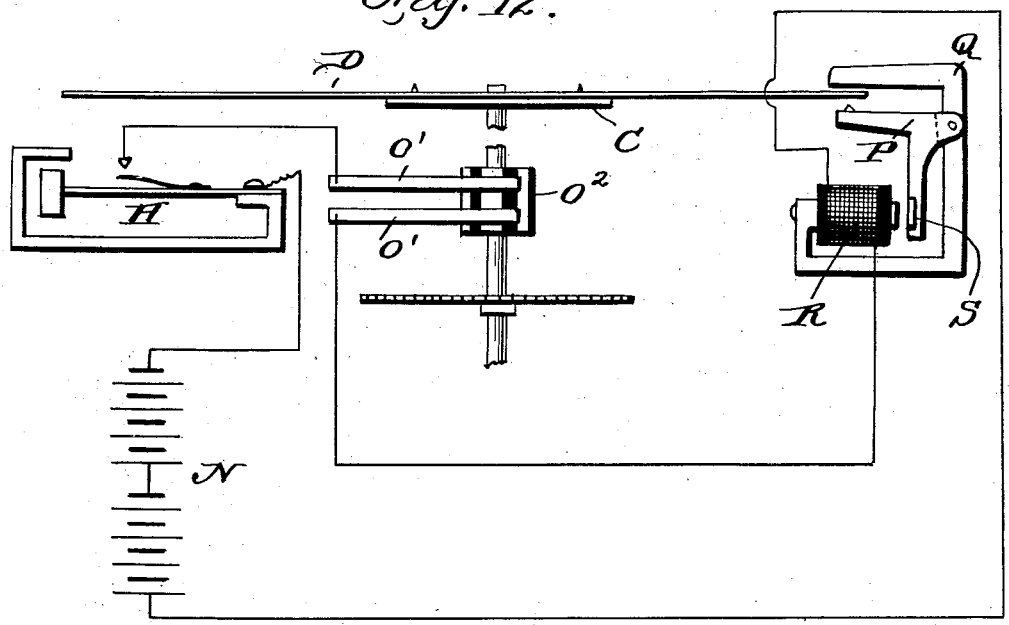

In the drawings forming a part of this specification:—Figure 1 is a perspective view of the complete device locked, and ready to be placed in a delivery wagon. Fig. 2 is a top plan view of the same, the top being removed, so as to show the recording dial. Fig. 3 is a top plan view of the recording dial being removed. Fig. 4 is a sectional plan view showing the clock work perforator, vibrator and electric connections. Fig. 5 is a sectional elevation of the complete device. Fig. 6 is a detail perspective view showing means for constantly making and breaking the circuit. Figs. 7 and 8 are sectional plan views of said mechanism illustrating the making and breaking of the circuit. Fig. 9 is a detail view of the perforator, together with the electro-magnet operating the same. Fig. 10 is a detail view of the vibrator. Fig. 11 is a diagrammatic view of the device and Fig. 12 is a diagrammatic view of a slightly modified construction.

In the practical embodiment of my invention, I employ a box or case A, which is provided with a top or cover A' which can be securely locked, so that no access can be had to the interior of the case, except by one entitled to have such access, thereby avoiding any tampering with the device. This box or case A may be of any suitable size or shape and has a horizontal partition $A^2$, fixed therein adjacent the top of the box, and to which is attached the clock-work B, the shaft B', of which projects upwardly through the partition $A^2$ and this shaft corresponds with the shaft of the ordinary clock-work which would carry the minute hand of a clock. This shaft B' has a disk C rigidly connected to its upper end, said disk having its upper face provided with barbs or points C', which are intended to engage a paper dial D and securely hold the said dial upon the disk so that the operation of the clock-work after being properly wound will cause the paper dial to rotate after the manner of the ordinary minute hand of a clock. This dial is sub-divided into hours, and fractions thereof, so that the exact time of motion and rest can be correctly measured from the perforation or indentations made upon said dial.

For the purpose of indenting or perforating the dial, I employ a perforator which will operate only while the device as a whole is being subjected to a jarring motion, and when the vehicle is at rest, no perforations or indentations will be made, but the dial will continue to rotate, and consequently the periods of movement and rest can be accurately recorded, and in constructing a perforator in accordance with my invention, I preferably employ a punch E, which is connected to the armature F, which carries the cores F' operating in the spool magnets F², it being understood that when these magnets are energized, the armature is drawn up carrying with it the punch E, which is thereby brought into contact with the edge of the paper dial, said edge passing through a guide G, which is arranged directly above the magnets and punch and which serve to guide not only the dial, but also the punch, so that a clean, clear-cut perforation or indentation will be made. The guide G is arranged above the partition A², while the electro-magnets are arranged below said partition, and the punch it will be understood, works through an opening in the said partition.

For the purpose of energizing the electro-magnets, only during periods of motion, I employ a vibrator H which is set in motion whenever the vehicle moves, and causes current to be constantly interrupted and consequently the magnets will be constantly energized and deënergized, thereby forcing the punch up and down and as long as the vehicle is in motion the dial will be rotated and a punch will produce perforations or indentations upon the edge of the dial, and thereby indicate the exact number of minutes the vehicle is in motion and when the vehicle comes to a stop, the punch will cease to operate inasmuch as the magnets will cease to work, owing to the vibrator coming to a stand-still.

The vibrator H is preferably constructed with a flat steel spring H', secured to a bar H² which in turn is arranged beneath the partition A² and this bar is provided at the opposite end with a depending bracket H³, which serves to limit downward movement of the weight H⁴ arranged upon the free end of the spring H'. A contact-plate I is arranged upon the upper side of the spring H', and is adapted to contact with an adjustable screw K, which is arranged in an insulating sleeve K', which passes through the bar H², and a conductor wire L, leads from this contact-screw K, to the electro-magnets and a wire M leads from the spring H', to the battery N, and this battery is connected at the opposite end with the electro-magnets by means of a wire O, but this wire O, is interrupted as it passes through the clock-work and is connected to two contact-plates O', and arranged between these contact plates O', is a contact wheel O² mounted upon the shaft O³, which forms a part of the clock-mechanism, and as the clock-mechanism is constantly in operation, this contact-wheel rotating between the contact plates will cause the circuit to be constantly made and broken, Fig. 7 indicating the position the parts assume when the circuit is closed, and Fig. 8 the position the parts assume when the circuit is broken. This constant making and breaking of the circuit at this point, however, will have no effect whatever upon the perforator, unless the circuit is also closed at the points I and K, and as the circuit is open at I and K, during a period of rest it is obvious that no perforation or indentation can be made during such period although the dial continues to rotate, but the moment the vibrator is set in motion, the current becomes completed, and the constant making and breaking of the circuit causes the perforator to operate and record the motion upon the edge of the dial.

In Fig. 12 I have shown a very slight modification in which the perforator is arranged upon a bell-crank lever P which is pivoted to a bracket Q which carries the electro-magnets R, which operate upon the armature S attached to the opposite end of the bell-crank lever P. In all other respects, however, the construction and operation of the parts are the same as already described.

It will of course be understood that the details of construction and arrangement can be changed or altered without materially departing from the broad principle of my invention, which comprehends the recording of periods of motion upon a dial through the medium of a punch or perforator which is operated electrically whenever a vibrator is set in motion by the jarring of the vehicle which carries the device.

From the above description when taken in connection with the accompanying drawings, it will be seen that I provide a device which can be adjusted and set in a vehicle such as a delivery wagon and that as long as said wagon is in motion such motion will be recorded upon the dial, and when the vehicle is stopped, the duration of the stop will be indicated by the lack of perforations and the extent of the space so passed over. It will thus be possible for the proprietor to ascertain not only the number of stops made by the driver, but also the length of time of each stop, and by having the route mapped out in advance, he can very easily ascertain whether the driver is faithfully performing his duties.

The invention can also be applied to railroad use for the purpose of indicating the condition of the road-bed or track and it can also be used for any purpose where it is desired to record the motion of any thing upon which the device rests, or is mounted.

Having thus fully described my invention, what I claim as new and desire to secure by Letters Patent is:—

1. In a device of the kind described, the combination with a rotating mechanism adapted to carry a dial, of a gravity operated perforator arranged in conjunction with the rotating mechanism, said perforator being adapted to operate upon the dial whenever the device as a whole is subjected to a jarring motion, this motion serving to set the perforator in operation, contact plates arranged in the circuit between the perforator and vibrating circuit closer, and a mechanically rotated circuit closer arranged between the contact plates and adapted to engage the same.

2. A device of the kind described comprising in combination a rotating mechanism adapted to carry a dial and an electro-magnetic perforating device together with a gravity operated circuit closer adapted to be put into operation whenever the device as a whole is subjected to a jarring motion, contact plates arranged in the circuit between the perforator and vibrating circuit closer, and a mechanically rotated circuit closer arranged between the contact plates and adapted to engage the same.

3. A device of the kind described comprising in combination a rotating mechanism adapted to carry a dial, an electro-magnetic perforating device arranged in connection with the rotating mechanism and adapted to operate upon the dial, and a spring actuated circuit controlling device operated by gravity whenever the device as a whole is subjected to a jarring motion, contact plates arranged in the circuit between the perforator and vibrating circuit closer, and a mechanically rotated circuit closer arranged between the contact plates and adapted to engage the same.

4. A device of the kind described, the combination with a clock mechanism for operating the dial, of an electro-magnetic perforating device adapted to operate upon the dial and a vibrating circuit closing device impelled by gravity and spring action for making and breaking the circuit in which the perforator is located, contact plates arranged in the circuit between the perforator and vibrating circuit closer, and a mechanically rotated circuit closer arranged between the contact plates and adapted to engage the same.

5. In a device of the kind described, a clock work for rotating a dial, an electromagnetic perforating device adapted to operate upon the dial, a vibrator having a circuit closing device arranged in connection therewith, conductor wires leading from the vibrator to the perforator, and from the perforator through the clock work, and a make and break device arranged in connection with and operated by the clock work, for the purpose specified.

6. In a device of the kind described, a box or case having a top or cover adapted to be secured thereto, a partition arranged in said box or case, a clock-work connected to said partition, a paper dial subdivided to indicate periods of time, and rotated within the box or case by means of the clock work, an electro-magnetic perforating device adapted to operate upon the paper dial, a spring and gravity impelled vibrator, the contact plate and screw carried by the vibrator, the make and break device arranged in connection with and operated by the clock work, and the conductor wires connecting the make and break devices and the perforator, as set forth.

7. A device of the kind described, a clock work for operating a dial, the electro-magnetic perforating device comprising a punch and guide, a vibrator comprising a weighted spring carrying the circuit closing plate and a bracket bar carrying the contact screw, a make and break device arranged in connection with the clock work and operated thereby, and the conductor wires leading from the electro-magnets to the make and break devices, as set forth.

EDWARD FARINGTON CHANDLER.

Witnesses:
 WALTER UNDERHILL,
 ROBERT K. FORTH.